252-518 SR
1/6/87 OR H 000,183

United States Statutory Invention Registration [19]

[11] Reg. Number: H183
[43] Published: Jan. 6, 1987

Karasz et al.

[54] CONDUCTING POLY (P-XYLYLIDENES)

[75] Inventors: Frank E. Karasz; Robert W. Lenz, both of Amherst; David R. Gagnon, Sunderland; James D. Capistran, Leverett, all of Mass.

[73] Assignee: The United States of America as represented by the Secretary of the Air Force, Washington, D.C.

[21] Appl. No.: 766,723

[22] Filed: Aug. 19, 1985

[51] Int. Cl.[4] ..... H01B 1/06
[52] U.S. Cl. ..... 252/518; 524/401; 524/408; 524/411; 524/422; 427/393.5; 427/407.1; 252/500
[58] Field of Search ..... 252/500, 518; 524/401, 524/408, 411, 422; 427/393.5, 407.1

[56] References Cited

U.S. PATENT DOCUMENTS

| | | | |
|---|---|---|---|
| 3,401,152 | 9/1968 | Wessling et al. | 260/78.4 |
| 3,532,643 | 10/1970 | Wessling et al. | 260/2 |
| 3,706,677 | 12/1972 | Wessling et al. | 260/2 H |
| 4,528,118 | 7/1985 | Murase et al. | 252/518 |

OTHER PUBLICATIONS

"Poly-p-xylylidenes", Hoeg et al, J. Polymer Sci Pt B, 2(7), 697-701 (1964).
"Electrically conducting derivative of poly(p-phenylene vinylene)", Wnek et al, Polymer, 20(12), 1441-1443 (1979).
"Electrically Conducting Polymers: $AsF_5$-Doped Poly(phenylenevinylene) and Its Analogues", Gourley et al, Makromolecules 1984, 17, 1025-1033.

*Primary Examiner*—Richard D. Lovering
*Assistant Examiner*—Jack Thomas
*Attorney, Agent, or Firm*—Donald J. Singer; Charles E. Bricker

[57] ABSTRACT

Poly (p-xylylidenes) having a high degree of polymerization in the form of films, foams or highly molecularly oriented films and fibers are chemically modified from insulators to conducting materials by exposure to either p- or n-type dopants. Poly (p-xylylidene) films are cast from aqueous solutions of a poly (p-xylene-α-dimethylsulfonium salt) polyelectrolyte. Processing of the films at elevated temperatures can yield both fibers and foams. Exposure of the poly (p-xylylidene) films, fibers or foams to p-type dopants result in an up to fifteen order of magnitude increase in conductivity, while n-type coping yields a nine order of magnitude increase. Doping of molecularly oriented films and fibers yields a highly anisotropic conductor with a greatly improved conductivity in the orientation direction.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONDUCTING POLY (P-XYLYLIDENES)

RIGHTS OF THE GOVERNMENT

The invention described herein may be manufactured and used by or for the Government of the United States for all governmental purposes without the payment of any royalty.

BACKGROUND OF THE INVENTION

This invention relates to polyxylyidenes, particularly electrically conductive polyxylylidenes.

Considerable research has been devoted to electrically conducting polymers. It has been estimated that replacement of copper wiring in large aircraft with electrically conductive polymer "wires" could result in a weight savings of several hundred pounds. Such a savings in weight would be reflected in a savings in fuel.

A major portion of this research has been directed to polyacetylene. This polymer can be doped by a large variety of substances to room-temperature conductivities of about $10^3$ ohm-cm$^{-1}$. Aromatic polymers such as poly (phenylene), poly (phenylenevinylene) (PPV), and poly (phenylene sulfide) (PPS) have also been shown to undergo increases in electrical conductivity when exposed to various electron-donor or -acceptor compounds. Low molecular weight poly(p-xylylidene) is, in general, infusible and insoluble. Thus, even though this material can be treated to obtain increases in electrical conductivity, it is little more than a laboratory curiosity since it cannot be formed into useful articles.

OBJECTS OF THE INVENTION

It is an object of the present invention to provide a method for modifying the electrical properties of high molecular weight poly (p-xylylidenes).

It is another object of this invention to provide n- and p-type conducting and semiconducting poly (p-xylylidene) articles.

Other objects, aspects and advantages of the present invention will be apparent to those skilled in the art from the following description of the invention.

SUMMARY OF THE INVENTION

In accordance with the present invention there is provided a method for modifying the electrical properties of high molecular weight poly (p-xylylidenes). Also provided are n- and p-type conducting and semiconducting articles made of poly (p-xylylidenes).

The high molecular weight poly (p-xylylidenes) employed in the present invention have recurring units of the structure:

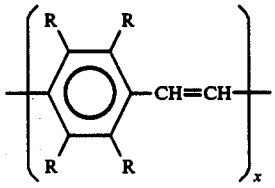

wherein R is hydrogen, an alkyl or alkoxy having from 1 to 4 carbon atoms or a halogen having an atomic number not greater than 35, with the proviso that not more than two of the R groups is either a halogen or an alkyl having from 1 to 4 carbon atoms, and x is an integer from about 150 to about 20,000.

These poly (p-xylylidenes) are prepared by converting water-soluble polyelectrolytes by the method described in U.S. Pat. Nos. 3,401,152, 3,532,643 and 3,706,677. The polyelectrolyte solutions are wet cast into film form, drawn into fibers or blown into foam form.

The poly (p-xylylidene) film, fiber or foam is doped with a p-type dopant such as $AsF_5$, $SbF_5$, $H_2SO_4$ or $HClO)_4$, or with an n-type dopant such as sodium naphthalide, under conditions whereby oxygen is excluded. The doped article is thereafter protected from the intrusion of oxygen and moisture.

DESCRIPTION OF THE PREFERRED EMBODIMENTS

The polyxylylidenes employed in the present invention are prepared by converting water-soluble polyelectrolytes as described in the aforesaid U.S. Patents. These polyelectrolytes are derived from monomeric sulfonium salts and have recurring units of the structure

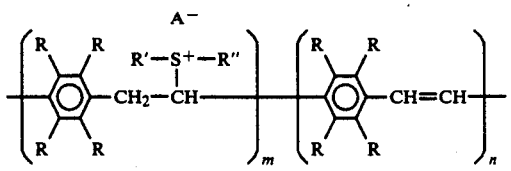

wherein R is as described above, R′ and R″ each represent an alkyl or hydroxyalkyl group containing from 1 to 4 carbon atoms, A is an anion derived from any low molecular weight acid so long as it does not precipitate polymer or react with polymer in aqueous solution and m and n are integers which indicate the ratio of the respective recurring units in this structure. Suitable low molecular weight acids from which the anion A can be derived include inorganic acids such as HCl or HBr, or carbonic acid which provides a bicarbonate ion, and organic acids such as acetic, propionic, butyric, maleic, citric or oxalic acid.

The monomeric sulfonium salts have the formula

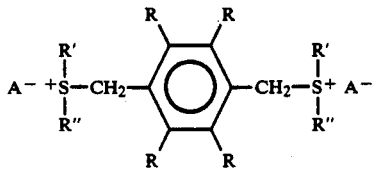

wherein R, R′, R″ and A are as described above. Suitable monomeric sulfonium salts include p-phenylene dimethylene bis (dimethyl sulfonium chloride); 2,5-dimethyl-p-phenylene dimethylene bis (dimethyl sulfonium chloride); p-phenylene dimethylene bis (diethyl-sulfonium chloride); p-phenylene dimethylene bis (dipropyl sulfonium chloride); p-phenylene dimethylene bis (di-n-butyl sulfonium chloride); 2,3,5,6 - tetramethyl-o-phenylene dimethylene bis (dimethyl sulfonium chloride); p-phenylene dimethylene bis (methyl butyl sulfonium chloride); 2,5-dimethyl-p-phenylene dimethylene bis (diethyl sulfonium chloride); p-phenylene dimethylene bis (diethyl sulfonium bicarbonate); p-phenylene dimethylene bis (diethyl sulfonium bromide); 2,5-dimethyl-p-phenylene dimethylene bis (diethyl sulfonium bicarbonate); 2-methyl-p-phenylene dimethylene bis (dimethyl sulfonium) chloride); 2,5-dimethoxy-p-phenylene dimethylene bis (dimethyl sulfonium chloride); and the like.

The monomeric sulfonium salts polymerize to form the desired polyelectrolytes in a strongly basic solution having a pH of 11 or greater, in a substantially oxygen free environment. Any basic source of hydroxide ions can be used including NaOH, KOH, $Ca(OH)_2$, a quaternary ammonium hydroxide, a sulfonium hydroxide, and the like. The preferred solvent is water in order to obtain high polymerization rates and solublization of the resulting polyelectrolytes. However, a suitable solvent can also be a mixture of water and an organic solvent which is compatible with water and does not react with or precipitate the sulfonium salt, such as methanol, dioxane, benzyl alcohol, tetrahydrofuran, and ether.

The sulfide, R'-S-R'', is eliminated during the polymerization reaction and should be removed from the aqueous phase as it is formed to achieve rapid polymerization. Production of high molecular weight polyelectrolytes is favored by low temperatures, high concentrations of sulfonium ions and hydroxide ions, and the substantial exclusion of oxygen from the reaction mixture. The pendant sulfonium groups on the polyelectrolyte also react with hydroxide ions but at a slower rate than the polymerization reaction. In order to reduce the extent of this side reaction and produce a high concentration of sulfonium groups in the polyelectrolyte, the polymerization is preferably carried out at low temperatures, i.e., not more than about 25° C. For the same reason, a large excess of base should not be used in the reaction. Reactions using one equivalent of base per mole of monomer are preferred.

Isolation of the polyelectrolyte product is carried out by quenching the polymerization reaction with acid. The aqueous solution of the polyelectrolyte is dialyzed to remove low molecular weight material.

The polyelectrolyte is converted to the corresponding polyxylylidene by any process which will cause the sulfonium side group to eliminate leaving a double bond. Normally, this process is carried out by drying the polyelectrolyte and heating, if necessary, to induce decomposition. The decomposition can be carried out at temperatures between about 0° and 300° C. In converting to the polyxylylidene, the chemical reaction involves only substituents in the polymer chain, and does not involve a change in the degree of polymerization.

The overall reaction is as follows:

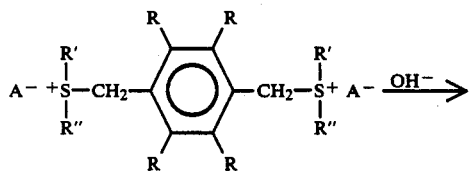

-continued

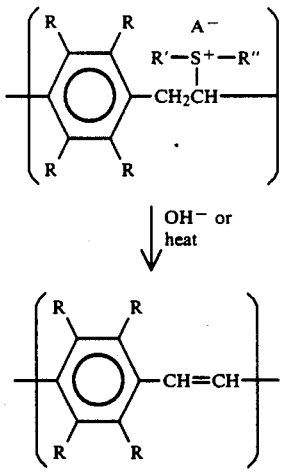

To prepare the polyxylylidene articles, the essential shaping is done with the precursers of the polyxylylidenes, i.e., before conversion of the water-soluble polyelectrolyte, or concurrently with the early stages of such conversion to the polyxylylidene.

Films are prepared by casting an aqueous solution of a polyelectrolyte as a wet film onto the suitable substrate, such as a glass plate, drying the film and converting to polyxylylidene as previously described. The resulting film can be stripped from the substrate in the form of a self-supporting film or may be left on the substrate as a coating. Self-supporting film can be oriented by drawing during the conversion to the poly(xylylidene), using any procedure known in the art.

Fibers may be prepared by extruding the aqueous polyelectrolyte into an aqueous, strongly basic solution at a temperature of from about 0° to about 100° C., and thereafter heating the resulting thread-like coagulate at a temperature of about 25° C. to about 300° C. The thread-like coagulate can be dried and cured in a single step or in stage-wise manner by drying at the lower portion of the above-noted temperature range, then curing at a higher temperature.

Fibers may also be prepared by first casting a wet film of the polyelectrolyte drying the wet film at a temperature below about 90° C., orienting the film by drawing with heating to a higher temperature and subsequently converting the oriented film to filaments. Alternatively, the dried film can be slit into strips before being drawn.

Foams are prepared by casting a wet film of the polyelectrolyte, drying the wet film, very rapidly raising the temperature of the dried film to a temperature from about 200° C. to about 350° C. so that the film expands to a cellular material before the polyelectrolyte is converted completely to a polyxylylidene.

The smallest dimension, i.e., width, thickness or diameter of the polyxylylidene article is about 0.1 mil (fiber) to about 100 mils (foams).

The fabrication of polyxylylidene films, fibers and foams, discussed above, is known in the art and does not, in and of itself, form a part of the present invention.

Conversion of the polyelectrolyte II, above, into the polyxylylidene III is generally incomplete, with the resulting polyxylylidene having repeating units of the following structure:

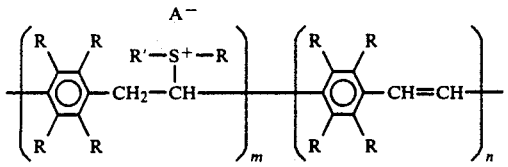

wherein R, R', R'' and A are previously described, and wherein m and n are integer values and the ratio of m to n ranges from about 2:1 to 1:11. The ratio of m to n is altered by thermally annealing the shaped article at a temperature of about 25° to 350° C. for about 1 to 36 hours. During the annealling step, film and fibrous articles may be unidirectionally drawn using a draw ratio of 1:1 to about 15:1.

The shaped, annealed poly (p-xylylidene) materials may be classified as non-conductors. Poly (p-phenylenevinylene) has, for example, an electrical conductivity of less than $10^{-13}$ (ohm-cm)$^{-1}$. We have found that these shaped poly (p-xylylidene) materials can be chemically modified to yield conductive and semi-conductive materials, by treating the shaped and annealed poly (p-xylylidene) articles with at least one dopant under conditions whereby oxygen is excluded, and thereafter excluding oxygen from the treated article.

The dopants useful in the practice of the present invention include p-type dopants such as $AsF_5$, $SbF_5$, $H_2SO_4$ and $HClO_4$, and n-type dopants such as sodium naphthalide in tetrahydrofuran.

Doping of the poly (p-xylylidene) materials is carried out under conditions whereby oxygen is excluded. Any closed system capable of maintaining a vacuum of less than about $10^{-2}$ torr or an inert atmosphere of nitrogen, helium, argon or the like can be used.

In preparation for doping, the poly (p-xylylidene) material is placed in the doping apparatus and the apparatus is evacuated or completely flushed to remove oxygen. If desired, a two-probe or four-probe conductivity probe may be attached to a portion of the polymeric material, e.g., using a conductive graphite adhesive, for monitoring the decrease in resistance. The polymeric material is then contacted with the dopant until a desired conductivity in the polymer is achieved. If using the conductivity probe, the decrease in resistance can be continuously monitored during the doping step; otherwise the time required for doping is based upon prior experience with the polymer, dopant and conditions employed.

During doping with $AsF_5$ it is desirable to employ means such as a pentane slush bath to maintain low vapor pressure so as to minimize rapid and possibly inhomogeneous doping. With $SbF_5$, $H_2SO_4$ and $HClO_4$ it may be necessary to heat the dopant to achieve a uniform atmosphere within the doping apparatus. In the case of the p-type dopant, sodium naphthalide in THF, the polymer is immersed in the doping solution.

Following doping with the gaseous dopants the apparatus is evacuated to remove residual dopant in the polyer. With dopants in a solvent, the dopant solution is removed and the polymeric article is washed with pure solvent to remove excess dopant, then dried in vacuo.

The thus-doped poly (p-xylylidenes) are oxygen and moisture sensitive, i.e., conductivity of the doped polymer decreases when exposed to air. Accordingly, the doped polymer is maintained in a moisture-oxygen-free condition, either by mounting the doped polymer in a closed container containing an inert atmosphere or by covering the polymer over with a moisture- and oxygen-impermeable material such as polyvinyl- fluoride or the like. For example, conductive cabling can be fabricated by doping poly (p-xylylidene) bundled filaments and covering the filament bundle with an impermeable polymer. Electrical connection to such cabling can be accomplished using an insulation displacement-type connector.

Undoped poly (p-xylylidene) film has a conductivity less than $10^{-13}$ (ohm-cm)$^{-1}$. Conductivities ranging from $10^{-11}$ (ohm-cm)$^{-1}$ to $10^{1}$ (ohm-cm)$^{-1}$ have been achieved with this polymer using $AsF_5$ as the dopant. Oriented poly (p-xylylidene) film with draw ratios up to about 15:1 typically exhibit a conductivity in the direction of orientation about 100 times greater than unoriented film while transverse conductivity is about 5 times less than unoriented film. This anisotropy is generally proportional to the degree of orientation.

The following examples illustrate the invention:

Example I p-type Doping of Poly (p-xylylidene) Films with $AsF_5$

Thin films of poly(p-xylylidene were prepared by casting of the polyelectrolyte film followed by thermal elimination in a vacuum or $N_2$ atmosphere at temperatures ranging from 85°to 350° C. This temperature protocol yields polymers with m to n ratios of from 2:1 to greater than 1:11 respectively. A film sample measuring $\approx 15 > 5 \times 0.005$ mm was mounted across the platinum leads of a four-probe conductivity apparatus using a colloidal electrically conductive graphite adhesive. A tared reference film of similar dimension was used to measure dopant weight uptake. Prior to use, all dopants were degassed by at least three freeze (−196° C.), pump, thaw cycles in order to remove traces of oxygen. The four-probe doping vessel was evacuated to a pressure of less than $10^{-4}$ torr. Using standard vacuum manifold techniques, the room temperature four-probe apparatus was opened to the vapor pressure of $AsF_5$, usually about 100 torr when the $AsF_5$ is contained in a cold finger at −78° C. During doping, the decrease in resistance was monitored continuously over a period of several days. The resistance decreased to about 90% of its limiting value within only about 5 hours, however, the actual limiting value was reached only after between two and ten days, depending upon the thickness of the film. The excess dopant was removed cryogenically and the same opened to vacuum before recording final resistance. A maximum conductivity of $\approx 10$ S/cm was attained using $AsF_5$ per 4 polymer repeat units.

Example II p-Doping of Uniaxially Stretch Oriented Poly(p-xylylidene) Films with $AsF_5$ The doping procedure for the oriented films, fibers or foams of poly(p-xylylidene) is exactly the same. That is, films, fibers or foams of known dimensions are mounted across the platinum fourprobe electrodes followed by the purification, evacuation, and doping procedure outlined in Example I. The maximum conductivity attained, for films which were oriented to 11.5 times the initial length, was 2180 S/cm. Weight uptake data for oriented samples were generally quite scattered due to errors introduced with extremely light samples, however, typical approximate values centered about 30–40% $AsF_5$ weight uptake. The foam samples attained a conductivity and weight uptake equivalent to the unoriented films when corrections were made for the density decrease of the foams.

Example III p-Doping with $H_2SO_4$

In this example samples were mounted as in examples I and II above, the difference being that a bulb of room temperature (reagent grade. 98%) $H_2SO_4$ was attached to a side arm of the four-probe vessel. After evacuation of the bulb and four-probe, the deoxygenated $H_2SO_4$ vapor (at room temperature pressure is less than 1.0 torr) was allowed to fill the four-probe vessel. Again, resistance was measured continuously with a limiting conductivity of 125 S/cm reached after 3 days. This conductivity was about 20% ionic in nature as determined by passing a current through the sample which caused a small decrease in conductivity to $\approx$30 S/cm. The weight uptake was $\approx$180% which corresponds to $\approx$1.8 $H_2SO_4$ molecules per polymer repeat unit.

Example IV p-Doping with $HClO_4$

The same procedure as with the $H_2SO_4$ dopant (Example III) was used with deoxygenated room temperature $HClO_4$ in the side bulb. A maximum limiting conductivity of 0.28 S/cm was reached within 2 days. Weight uptake was not measured. Again, the conductivity was partially ionic in character.

Example V n-Doping with Sodium Naphthalide

A sample of unoriented poly (p-xylylidene) was mounted across the platinum leads of the four-probe vessel as in the above Examples I–IV. The same side bulb arrangement as used with the $H_2SO_4$ and $HClO_4$ doping apparatus was used with a 1 M sodium naphthalide solution in the side bulb. The dopant solution was a dark green color and was prepared by adding a 1.5 fold excess of sodium to 50 ml of an anhydrous THF/naphthalene solution with stirring. This room temperature dopant solution was poured into the four-probe vessel until it covered the mounted sample and was allowed to react with the PPX for a time period of two hours, after which the sodium naphthalide was poured back into the side bulb. Pure THF was cryogenically distilled into the four-probe vessel repeatedly to rinse the sample and four-probe vessel until no free sodium naphthalide remained. The sample vessel was then dried by opening to dynamic vacuum, at which time the doped conductivity was measured to be about $2\times10^{-4}$ S/cm with a weight uptake of about 65%. Continuous monitoring of the conductivity as doping proceeded was not possible because of the ionic conductivity of the sodium naphthalide solution.

Various modifications to the present invention will be apparent to those skilled in the art.

We claim:

1. A method for making an at least semiconducting article made of a high molecular weight poly (p-xylylidene) of the general formula

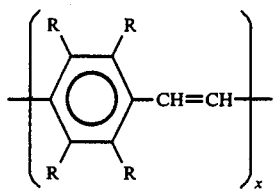

wherein R is selected from the group consisting of hydrogen, alkyl having from 1 to 4 carbon atoms and halogen of atomic number not greater than 35, with the proviso that not more than two of said R groups is halogen or alkyl having 1 to 4 carbon atoms, and X is an integer having a value between about 150 and about 20,000, wherein said poly )p-xylylidene) polymer is prepared by drying at a temperature between about 0° and 300° C. an aqueous solution of polyelectrolyte derived from monomeric sulfonium salts and having recurring units of the structure

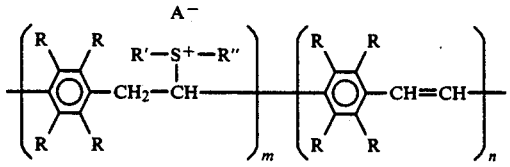

wherein R is as described above, R′ and R″ each represent an alkyl or hydroxyalkyl group containing from 1 to 4 carbon atoms, A is an anion, and m and n are integers which show the ratio of the receptive recurring units in the strucuture, said article being in the form of a film, fiber or foam having a length and other dimensions in which the length is large compared with at least one of said other dimensions, which comprises the steps of annealing said article at a temperature between about 25° and 350° C. for about 1 to 36 hours to provide an m:n ratio in the range of 2:1 to 1:11; doping the resulting annealed article in the absence of oxygen with a dopant selected from the group consisting of $AsF_5$, $SbF_5$, $H_2SO_4$, $HClO_4$ and sodium napththalide to a conductivity level at least $10^{+8}$ times greater than that of the undoped polymer;

and covering said article with an impermeable material.

2. The method of claim 1 wherein said article is a film and wherein said film is unidirectionally drawn during said annealing step using a draw ratio of from 1:1 to about 15:1.

3. The method of claim 1 wherein said article is a fiber and wherein said fiber is drawn during said annealing step using a draw ratio of from 1:1 to about 15:1.

4. The method of claim 1 wherein said article is a film and wherein said film is doped with a dopant selected from the group consisting of $AsF_5$, $H_2SO_4$ and $HClO_4$ to a conductivity of about 10 $(\text{ohm-cm})^{-1}$.

5. The method of claim 1 wherein said article is a film and wherein said film is doped with sodium naphthalide to a conductivity of about $10^{-4}$ $(\text{ohm-cm})^{-1}$.

6. The method of claim 2 wherein said film is doped using $AsF_5$ to a conductivity of about 2000 $(\text{ohm-cm})^{-1}$ in the direction of orientation.

7. The method of claim 3 wherein said fiber is doped using $AsF_5$ to a conductivity of at least about 500 (ohm-cm)$^{-1}$ in the direction of orientation.

8. The method of claim 1 wherein said impermeable material is polyvinyl fluoride.

9. A method for modifying the electrical properties of an article made of a high molecular weight poly (p-xylylidene) of the general formula

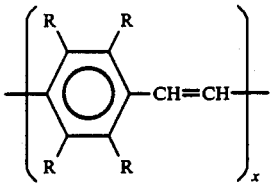

wherein R is selected from the group consisting of hydrogen, alkyl having from 1 to 4 carbon atoms and halogen of atomic number not greater than 35, with the proviso that not more than two of said R groups is halogen or alkyl having 1 to 4 carbon atoms, and X is an integer having a value between about 150 and about 20,000, wherein said poly (p-xylylidene) polymer is prepared by drying at a temperature between about 0° and 300° C. an aqueous solution of polyelectrolyte derived from monomeric sulfonium salts and having recurring units of the structure

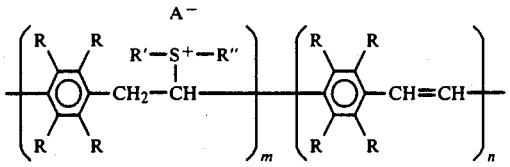

wherein R is as described above, R′ and R″ each represent an alkyl or hydroxyalkyl group containing from 1 to 4 carbon atoms, A is an anion, and m and n are integers which show the ratio of the receptive recurring units in the structure, said article being in the form of a film, fiber or foam having a length and other dimensions in which the length is large compared with at least one of said other dimensions, which comprises the steps of annealing said article at a temperature between about 25° and 350° C. for about 1 to 36 hours to provide an m:n ratio in the range of 2:1 to 1:11; doping the resulting annealed article in the absence of oxygen with sodium naphthalide to a conductivity level at least $10^{+8}$ times greater than that of the undoped polymer.

10. The method of claim 9 wherein said article is a film and wherein said film is unidirectionally drawn during said annealing step using a draw ratio of from 1:1 to about 15:1.

11. The method of claim 9 wherein said article is a fiber and wherein said fiber is drawn during said annealing step using a draw ratio of from 1:1 to about 15:1.

12. The method of claim 9 further comprising the step of covering said article with an impermeable material.

13. The method of claim 9 wherein said article is a film and wherein said film is doped to a conductivity of about $10^{-4}$ (ohm-cm)$^{-1}$.

* * * * *